US007197222B1

(12) United States Patent
Koenig

(10) Patent No.: US 7,197,222 B1
(45) Date of Patent: Mar. 27, 2007

(54) WAVEGUIDE INTERFACE

(75) Inventor: Mary K. Koenig, Seattle, WA (US)

(73) Assignee: Lumera Corporation, Bothell, WA (US)

( * ) Notice: Subject to any disclaimer, the term of this patent is extended or adjusted under 35 U.S.C. 154(b) by 0 days.

(21) Appl. No.: 11/299,007

(22) Filed: Dec. 9, 2005

(51) Int. Cl.
*G02B 6/10* (2006.01)

(52) U.S. Cl. ...................... 385/131; 385/129; 385/130; 385/132

(58) Field of Classification Search ................. 385/131
See application file for complete search history.

(56) References Cited

U.S. PATENT DOCUMENTS

| | | | | |
|---|---|---|---|---|
| 5,129,099 | A * | 7/1992 | Roberts | 455/81 |
| 6,734,755 | B2 * | 5/2004 | Cites et al. | 333/33 |
| 6,750,603 | B2 | 6/2004 | Huang et al. | 313/483 |
| 6,813,417 | B2 | 11/2004 | Oh et al. | 385/43 |
| 6,852,563 | B1 | 2/2005 | Dinu et al. | 438/57 |
| 6,895,162 | B2 | 5/2005 | Bintz et al. | 385/142 |
| 6,902,871 | B2 | 6/2005 | Dinu et al. | 430/321 |
| 6,937,811 | B2 | 8/2005 | Bintz et al. | 385/143 |

OTHER PUBLICATIONS

Nguyen, "Optimized Transition Between Coplanar Waveguide and the Microstrip Electrode of Polymer Electrode-Optic Modulator," *Microwave and Optical Technology Letters*, 1997, 16(5):283-287.

Teng, "Traveling-wave polymeric optical intensity modulator with more than 40 GHz of 3-dB electrical bandwidth," *Appl. Phys. Lett.*, 1992, 60(13):1538-1540.

"Taper Effect" Tutorial, Southwest Microwave, Inc., date of publication unknown, 9 pages.

* cited by examiner

*Primary Examiner*—Frank G. Font
*Assistant Examiner*—Mary El-Shammaa

(74) *Attorney, Agent, or Firm*—Fish & Richardson P.C.

(57) ABSTRACT

Apparatus and associated systems for transmission of signals within a wide bandwidth (e.g., from DC to 40 GHz and above) include a conduction path and ground structures in an arrangement to provide a smooth transition between propagation in a coplanar waveguide mode and propagation in a microstrip waveguide mode. Some embodiments may be provided without vias, for example, by providing low impedance connections between ground structures on different layers, where the connections are made external to a medium between the layers. Some embodiments may feature a monotonically decreasing gap between a signal conduction path and a coplanar ground structure. Such embodiments may be used, for example, to provide a low loss, wide bandwidth interface between a coaxial transmission line and a microstrip transmission line. As another example, one or more such structures may be used in an electro-optic modulator to control an optical signal.

12 Claims, 5 Drawing Sheets

WAVEGUIDE INTERFACE

TECHNICAL FIELD

Various embodiments may relate generally to waveguides, and particular embodiments may relate to coplanar and microstrip waveguides.

BACKGROUND

Electromagnetic signals may carry information from one location to another. For example, signals may be sent and received between two electronic devices that are processing information on a circuit within a device. Such signals may be sent and received as voltage, current, light, magnetic fields, or as electric fields, for example. In some systems, signals may be sent over great distances, for example, by transmitting and receiving the signals in the form of propagating electromagnetic waves.

There are many applications in which signals may carry information from one location to another. An exemplary application is an electro-optic modulator that may be used to modulate an optical signal in, for example, an optical communication system. In an electro-optic modulator, an optical signal may be modulated in response to modulation in an electrical field passing through a medium in which the optical signal is propagating. In some electro-optic modulators, a microstrip waveguide may be used to provide electric fields oriented to pass through a medium. The input optical signal may be split into two paths through the medium using, for example, a Mach-Zehnder configuration. In certain media, electric fields may induce a relative phase shift between optical signals in the split paths. At the output of the electro-optic modulator, the split signals are recombined. As such, the amplitude of the output optical signal is a function of the applied electric fields.

The electric fields may in turn be controlled by an electric signal that is transmitted to the electro-optic modulator through a transmission line. In some applications, the electric signal is transmitted through transmission lines that have electric field orientations that are not directly compatible with the electric field orientation used in a particular electro-optic modulator, which may be a microstrip waveguide. For example, an electric signal may be transmitted from a signal generator to a microstrip waveguide through a transmission line that includes coaxial and/or a coplanar waveguide sections.

Some applications may use one or more types of transmission lines to transport signals over a conductive signal path. Examples of transmission line types include coaxial cables, coplanar waveguides, microstrip waveguides and stripline waveguides. As a signal propagates through a transmission line, the signal has associated with it electric and magnetic fields. In each type of transmission line, the electric and/or magnetic fields may typically have a characteristic orientation. To transport a signal through more than one type of transmission line, some systems may provide transitions at the interfaces between different types of transmission lines. The interfaces may be designed to reduce or avoid abrupt changes in characteristic impedance that can cause signal loss.

In some applications, a forward and a return conductive path may provide a preferred low impedance current path between the source and the receiver. In some multilayer configurations, a coplanar return conductor on one layer may be electrically connected through vias to a microstrip return conductor on a different layer. In transmission lines and the interfaces between transmission lines, the geometries and properties of the forward and return signal paths, as well as the properties of the surrounding media, may determine the characteristic impedance. One technique for transitioning between coplanar and microstrip waveguides involves tapering geometries in the forward and return conductive paths.

SUMMARY

Apparatus and associated systems for transmission of signals within a wide bandwidth (e.g., from DC to 40 GHz and above) include a conduction path and ground structures in an arrangement to provide a smooth transition between propagation in a coplanar waveguide mode and propagation in a microstrip waveguide mode. Some embodiments may be provided without vias, for example, by providing low impedance connections between ground structures on different layers, where the connections are made external to a medium between the layers. Some embodiments may feature a monotonically decreasing gap between a signal conduction path and a coplanar ground structure. Such embodiments may be used, for example, to provide a low loss, wide bandwidth interface between a coaxial transmission line and a microstrip transmission line. As another example, one or more such structures may be used in an electro-optic modulator to control an optical signal.

Various embodiments may provide one or more advantages. For example, a low impedance and/or low inductance connection may be provided between a return (e.g., signal reference or ground) conductor in a coplanar waveguide portion and a return conductor in a microstrip waveguide portion. Such an embodiment does not require vias. Some embodiments may provide a smooth transition interface between a coplanar waveguide transmission line and a microstrip waveguide transmission line. Such a transition may be relatively easy to manufacture and minimizes signal loss. Moreover, the transition may enable a wide bandwidth connection for signal frequencies from very high frequency down to DC. Accordingly, very high frequency modulation with a controlled DC bias may be achieved without additional components (e.g., capacitive coupling). Furthermore, some embodiments may be sized to facilitate a mechanically robust, manufacturable, and direct coupling of a microstrip transmission line to widely used transmission lines, such as commercially available coaxial cables, for example.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
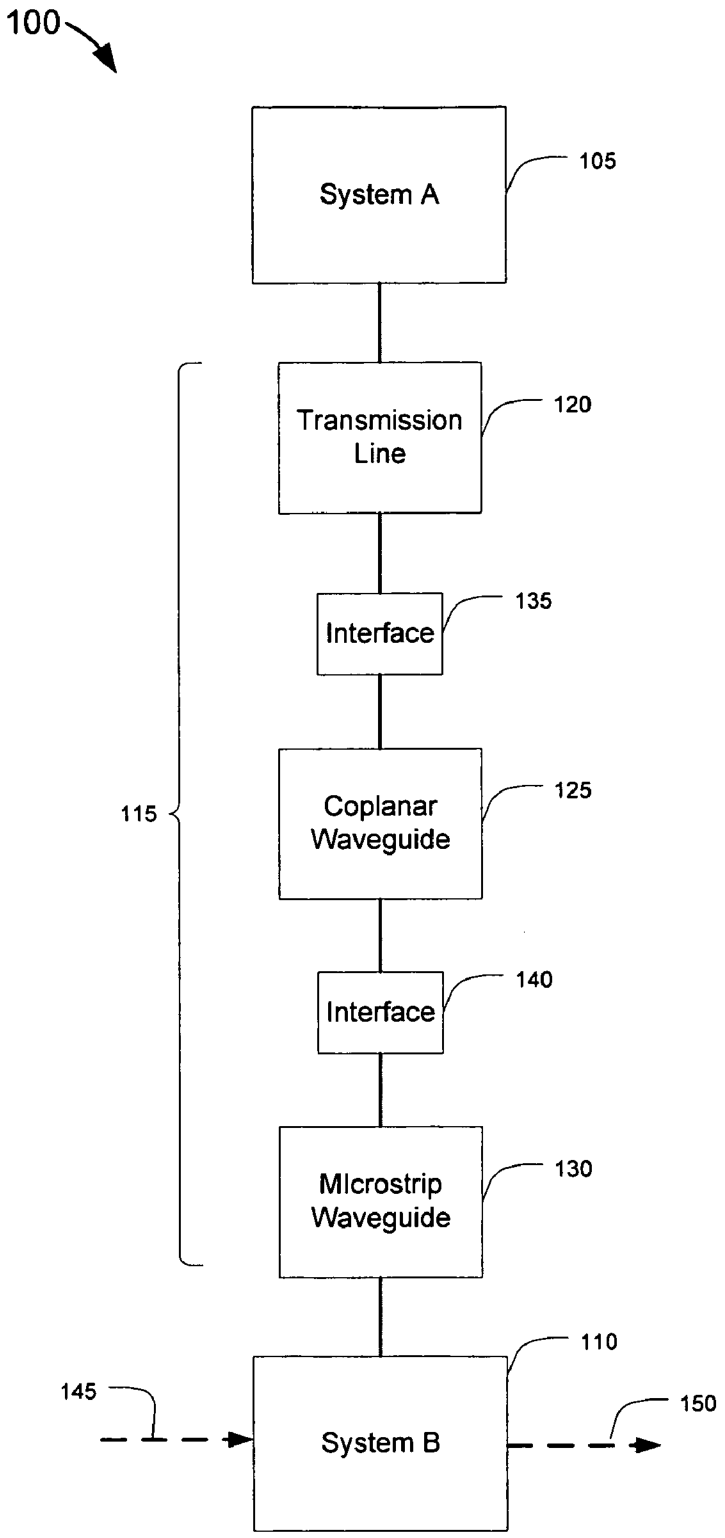
FIG. 1 is a schematic diagram showing an exemplary communication system having a signal modulation device show in detail in subsequent figures.

FIG. 1 shows an exemplary communication system 100 that enables signal communication between two devices. In this example, the communication system 100 includes a system A 105 and a system B 110, in which the system A 105 may send and/or receive signals from the system B 110. Signals may propagate between the system A 105 and the system B 110 through a signal path 115. The signal path 115 includes multiple transmission structures, including a transmission line 120, a coplanar waveguide 125, and a microstrip waveguide 130. To provide for transitions between these different transmission structures, the transmission line 120 is coupled to the coplanar waveguide 125 by an interface 135, and the coplanar waveguide 125 is coupled to the microstrip waveguide 130 by an interface 140. The system B 135 may optionally receive an input signal 145 and output an output signal 150 that may be controlled in accordance with the transmitted signal. In an electro-optic modulator, for example, the input signal 145 and the output signal 150 are typically optical signals. In one embodiment, the communication system 100 may be capable of transmitting and/or receiving signals with frequency components from 0 Hz to at least about 100 GHz or above, such as from about DC to about 40 GHz, for example.

The exemplary communication system 100 may be used in various signal communication applications. Examples of communication application may include communication systems, fiber optic communication systems, control systems, optical control systems, or measurement systems. In an exemplary communication system, the system A 105 may include a transceiver capable of transmitting signals through the transmission line 120 or may include an RF antenna that transmits signals through transmission line 120. In such a communication system, the system A 105 may include a GPS device and the system B 110 may be a patch antenna. In an exemplary control system, the system A 105 may be a controller that transmits analog and/or digital control signals through the transmission line 120. In this example, the system B 135 may be a device that uses transmitted signals through the microstrip waveguide 130 to control the output signal 150. For example, the system B 135 may be an electro-optical modulator that employs a Mach-Zehnder interferometer to control the power of the output 150 of the modulator. In an exemplary measurement system, the system A 105 may be a measurement device with an active RF circuit that transmits through transmission line 120, while system B 110 output 150 may lead to a spectrum analyzer.

The interface 135 connects the transmission line 120 and the coplanar waveguide 125. In one embodiment, the width of the signal conductor may decrease from the width of the transmission line 120 to the width of the signal conductor of the coplanar waveguide 125 in the interface 135. For example, the transmission line 115 may be a coaxial cable, which, in some embodiments, may be substantially wider than the width of the coplanar waveguide 125. The interface 135 may then provide a transition in signal path width from a coaxial cable to the coplanar waveguide 125.

The interface 140 connects the coplanar waveguide 125 and the microstrip waveguide 130. In one embodiment, the connection may include a transition from a substantially coplanar waveguide, in which the return conductor of the coplanar waveguide is on the same horizontal plane as the signal conductor, to a substantially microstrip waveguide, in which the return conductor is vertically separated from the signal conductor. In one application, this transition may be employed in a high frequency and wide bandwidth electro-optical modulator capable of propagating signals with frequency components that may range in frequency from DC to above at least 40 GHz.

The dimensions and shapes of the conductive structures in the interfaces 135, 140 may affect the propagation of the transmitted signal in the signal path 115. For example, physical features of the interfaces 140 may affect characteristic impedance, signal loss, return loss, insertion loss, reflected energy, and the like. In some embodiments of the signal path 115, the electric fields and/or current distribution at various frequencies may be a function of impedance variations in the interface 140. Such impedance variations may be reduced or substantially eliminated if the conductive structures of the interface 140 are arranged to provide for a smooth transition of electric fields (E-fields) and/or currents associated with propagating signals.

An interface, such as the interface 140, may be constructed using conductive structures that may include at least two conductive layers. In an embodiment, a first layer may provide the coplanar waveguide 125, including a signal conductor and a return conductor for the coplanar waveguide 125. A second layer may include a return conductor for the microstrip waveguide 130. In some embodiments, a low impedance connection may be provided between the return conductors on the first and third layers. Such a low impedance connection may be provided along an edge of a medium, and in some examples, may be implemented without using vias to make connections between the layers.

Figure 2:
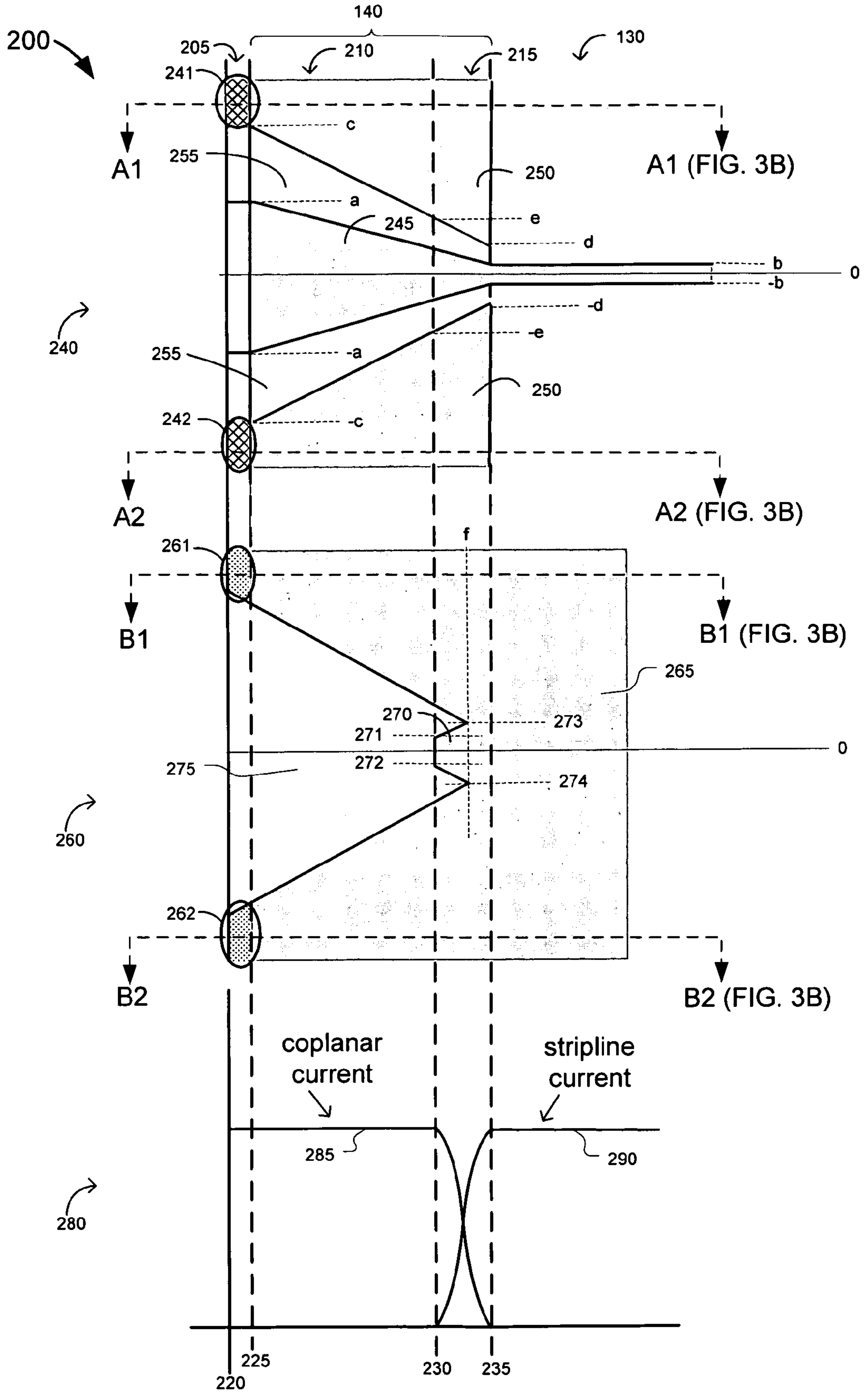
FIG. 2 is a top view of individual layers of an exemplary conductive layered structure, and a corresponding plot of signal strength.

One implementation of the interface 140 is shown in FIG. 2 as an exemplary conductive layered structure 200. The conductive layered structure 200 may be used, for example, to provide a substantially constant impedance characteristic for signals that propagate between the coplanar waveguide 125 and the microstrip waveguide 130.

FIG. 2 includes separated top views of an exemplary first layer 240 and an exemplary third layer 260. In an assembled interface, the layers 240, 260 may be substantially overlapping and lie in substantially parallel planes. In one embodiment, the layers 240, 260 may be substantially planar layers that are separated by one or more layers of other media, such as insulating dielectrics, cladding layers, and/or polymers, for example. In one embodiment, the first layer 240 and the third layer 260 cooperate to provide a substantially constant characteristic impedance and a substantially smooth transition of the E-field associated with signals as they transition from a coplanar waveguide to a microstrip waveguide. FIG. 2 also includes an exemplary plot 280 to illustrate representative coplanar and microstrip currents associated with a signal propagating through the conductive layered structure 200.

The conductive structure of the layers 240, 260 include a pre-tapering region 205, a tapering region 210, a transition region 215, and a microstrip waveguide region 130. Boundaries between each of the four regions 205, 210, 215 and 130 are described with reference to vertical reference lines 220, 225, 230, and 235. In this example, the reference line 220 is aligned approximately with an edge of the structure 200. In some embodiments, the reference line 220 may be aligned with an edge of the second layer 260.

As will be described in further detail with reference to FIGS. 3A–3C, some embodiments are substantially devoid of material in the region 205 on the layer 240, but have conductive material in the region 205 on the layer 260. In some embodiments, conductive material is deposited in contact with the layer 240 to create an electrical connection to another layer, such as the layer 260. Exemplary locations in the region 205 are indicated at which such conductive materials may be deposited to make connections between the layers 240, 260. One such connection may be made between locations 241 and 261, and another such connection may be made between locations 242, 262.

The reference line 225 indicates an approximate location of a boundary between the pre-tapering region 205 and the tapering region 210. The reference line 230 indicates an approximate location of a boundary between the tapering region 210 and the transition region 215. The tapering region 210 may have various lengths. In one example, the length of the tapering region may be about 700 μm. The reference line 235 indicates an approximate location of a boundary between the transition region 215 and the microstrip waveguide region 130. Depending on the design and other dimensions of the structure, the length of transition region 215 may vary. In one example, the length of the transition region 215 may be about 250 μm.

The exemplary first layer 240 includes a signal conductor 245, a coplanar return conductor 250, and a substantially non-conductive spacing 255 between the signal conductor 245 and the coplanar return conductor 250. The signal conductor 245 provides a conductive path for signals to propagate on the layer 240 from the reference line 225 and extending into the microstrip waveguide region 130. The coplanar return conductor 250 provides a return path for signal current propagating along the signal conductor 245 in the regions 210, 215.

The non-conductive spacing 255 may be a substantially non-conductive region between the signal conductor 245 and the coplanar return conductor 250. In one implementation, the non-conductive spacing 255 may be formed between the signal conductor 245 and the return conductor 250 using a photolithography process that selectively etches and removes conductive materials from the spacing 255, for example.

The return conductor 250 of this example includes two conductive regions on opposite sides of the signal conductor 245. Each region of the return conductor 250 extends from the reference line 225 to the reference line 235, and may extend longitudinally through the regions 210, 215. In some embodiments, there may be substantially no conductive material connected to the return conductor 250 in the microstrip region 130 on the layer 240.

For signals propagating along the signal conductor 245 in the region 210, E-fields may be substantially directed between the signal conductor 245 and the return conductors 250, thereby passing through and/or around the non-conductive spacing 255. As such, the E-fields associated with signals propagating through the signal conductor 245 and the return conductors 250 may be substantially coplanar in the region 210. In one embodiment, the signal conductor 245 and the return conductors 250 in the region 210 may behave at some frequencies substantially like a coplanar waveguide, such as the coplanar waveguide 125.

The second layer 260 of this example includes a return conductor 265 with an extended return conductor projection 270. To substantially avoid directing electric fields between the layers 240, 260 in the regions 205, 210, a substantially non-conductive region 275 extends from the return conductors 265, 270 to an edge of the structure 200 at the reference line 220. The return conductor 265 may include a conductive layer of material that extends generally into the microstrip region 130 in a substantially overlapping tapered structure for smoothly transitioning into a substantially microstrip relationship with the portion of the conductor 245 in the microstrip region 130 on the layer 240. The return conductor 265 also extends into the regions 205, 210, 215 in a substantially tapered shape. In one embodiment, the portions of the return conductor 265 that extend into the regions 210, 215 form substantially overlapping mirror images of the corresponding return conductors 250 in the regions 210, 215.

The extended return conductor projection 270 of this example forms a substantially tapered conductive structure. In this example, the projection 270 is a trapezoidal-shaped conductive structure that extends into a portion of the region 215. In other examples, the projection 270 may have other shapes or features, such as, substantially rounded edges, multifaceted edges (e.g., including edges that alternately extend toward and away from the reference point 225), or a combination thereof, for example. In some embodiments, acute angles may be reduced or eliminated, for example, by adding conductive material or adjusting angles of the edges.

For signals propagating along the signal conductor 245 in the microstrip region 130, E-fields may be substantially directed between the signal conductor 245 and the return conductor 265, thereby passing between the layers 240, 260. As such, the E-fields associated with signals propagating through the signal conductor 245 and the return conductors 265 in the microstrip region 130 may be substantially orthogonal to the layers 240, 260. In one embodiment, the signal conductor 245 and the return conductors 265 in the region 130 may behave at some frequencies substantially like a microstrip waveguide, such as the microstrip waveguide 130.

The separation distance between the first layer 240 and the second layer 260 may any distance suitable for an application, and may be selected based on practically achievable geometries and desired characteristic impedances, for example. For example, the layers 240, 260 may lie in substantially parallel planes that are separated by between about 7.5 μm and 250 μm, such as about 7.5, 9, 12, 15, or 20 μm, for example. The characteristic impedance of the signal conductor may be in part a function of the width of the signal conductor 245, the width of the non-conductive spacing 255, and the separation distance between the layers 240, 260.

The exemplary conductive layered structure 200 may provide an interface with a substantially constant impedance path and a substantially smooth E-field transition between a coplanar waveguide and a microstrip waveguide. In some embodiments, for example, the E-fields associated with a signal may smoothly transition in the transition region 215 from propagating in a substantially horizontal mode in the tapering region 210 to propagating in a substantially vertical mode in the microstrip region 130.

In the exemplary conductive layered structure 200, the signal conductor 245 tapers substantially monotonically in the tapering region 210 and the transition region 215 from (a) to (−a) at the reference line 225 to (b) and (−b) near the reference line 235. In this example, the width of the non-conductive spacing 255 may monotonically decrease to maintain a substantially constant impedance throughout the tapering region 210. As shown in the exemplary first layer 240, the non-conductive spacing 255 tapers from (c–a) near the reference line 225 to (d–b) near the reference line 235.

A transition means for coupling a coplanar waveguide portion and a microstrip waveguide portion of a signal path may include at least the portion of the signal conductor 245 in the transition region 215. In the transition region 215, the E-field changes its orientation. In general, E-fields tend to terminate on return conductors that are closest to the signal conductor surface. The extended return conductor edge 270 in the second layer 260 may enable a substantially continuous transition between a horizontally oriented E-field in the coplanar waveguide 125 to a vertically oriented E-field in the microstrip waveguide 130. In this example, the non-conductive spacing 255 decreases substantially monotonically in the transition region 215. At some point in or near the transition region 215, the width of the non-conductive spacing 255 approaches equality with the distance between the layers 240, 260. Around this point, in some embodiments, the E-field may tend to become approximately evenly divided between the return conductor 250 (i.e., coplanar mode) and the return conductor 265 (i.e., microstrip mode).

The extended return conductor edge 270 extends from the reference point 273 to the reference point 271, and from the reference point 274 to the reference point 272. As such, the extended return conductor edge 270 may gradually re-direct the E-field from the coplanar return conductor 250 in the first layer 240 to the microstrip return conductor 265 in the second layer 260. In particular application examples, the optimum dimensions for a, b, c, d, e, f, the reference line 230, and spacing between the reference points 271, 272 may be determined by performing simulations using commercially available electromagnetic simulator software.

The exemplary plot 280 shows an example of the return currents in the return conductors 250, 265. In the plot 280, a graph 285 shows a decrease in the return current in the coplanar return conductor 250 through the transition region 215. The graph 285 decreases smoothly and substantially without abrupt changes. Similarly, a graph 290 shows an increase in the return current in the microstrip return conductor 265 through the transition region 215. In embodiments, the graph 290 increases smoothly and substantially without abrupt changes. In some embodiments, the total current of graphs 285, 290 is substantially equal to the corresponding currents in the coplanar waveguide and the microstrip waveguide.

The graph 285 of the plot 280 may also shows exemplary return current on the first layer 240. As indicated in the graph 285 in the tapering region 210, the return current in the coplanar return conductor 250 remains substantially constant. In the microstrip region 130, there is substantially zero return current in the coplanar return conductor 250, as shown in the graph 285. Similarly, the graph 290 indicates that the return current in the microstrip return conductor 265 remains substantially constant throughout the microstrip region 130. In the tapering region 210, there is substantially zero return current in the return conductor 265, as shown in the graph 290.

The plot 280 illustrates an exemplary smooth transition of the coplanar and microstrip currents associated with the E-fields for a signal propagating along the signal conductor 245. The currents reflect a smooth transition of the E-fields from a substantially horizontal orientation in the tapering region 210 to a substantially vertical orientation in the microstrip region 130. A smoothly transitioning E-field may coexist with a substantially constant characteristic impedance of the signal conductor 245. For example, the characteristic impedance may be maintained at values such as about 50 Ohms, about 75 Ohms, about 100 Ohms, or up to at least 400 Ohms or more, for example.

There may be numerous implementation of the exemplary structure 200. In one embodiment of the first layer 240, (a), which is the half of the width of the signal conductor 245 at the reference line 225, may be about 100 μm. In the microstrip region 130, the width of the signal conductor 245, from (b) to (−b), may be about 18 μm. The width of the non-conductive spacing 255 may decreases from about 300 μm at the reference line 225 to about 21 μm at the reference line 230. In the third layer 260 of this example, the starting points 273, 274 of the extended return conductor 270 may be similar to or approximately match the dimension between the coplanar return conductor 250 at (e) and (−e), where (e) may be about 55 μm, for example. The distance between end points 271, 272 of the extended return conductor 270 may approximately match the width of the signal conductor 245 in the microstrip region 130, where the reference point 271 may be about twice the dimension of (b) from the reference point 272. In this example, (b) may be approximately 9 μm.

In this exemplary structure 200, the edge regions 241, 242 of the coplanar return conductor 250 and the edge regions 261, 262 of the return conductor 265 are connected through one or more conductive paths around the medium between the first layer 240 and the second layer 260. One connection may be made by providing a conductive path from the return conductor 250 at the region 241 to the return conductor 265 at the region 261, and another connection may be made by providing a conductive path from the return conductor 250 at the region 242 to the return conductor 265 at the region 262. In some embodiments, such connections may provide a low impedance path between the return conductors 250, 265 without or substantially without any vias.

Figure 3A:
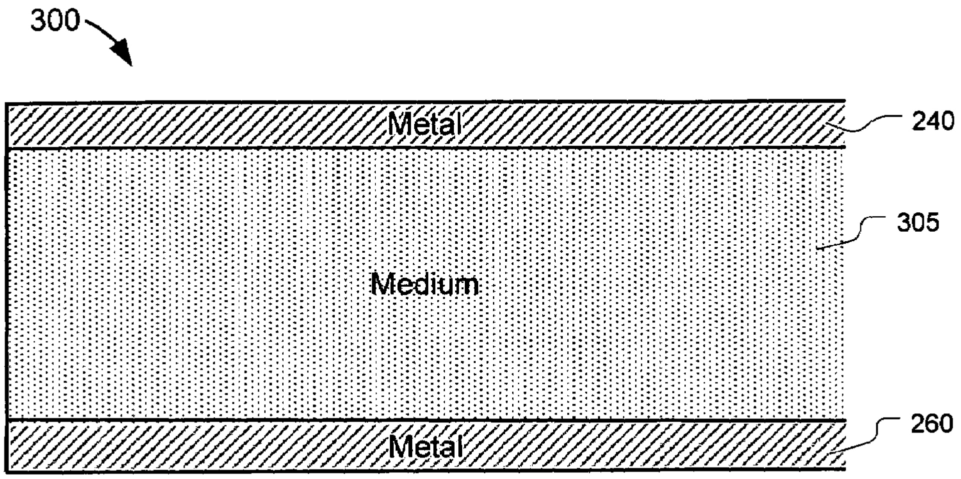
FIG. 3 is a cross-sectional view of an embodiment of the exemplary layered structure of FIG. 2.
Figure 3B:
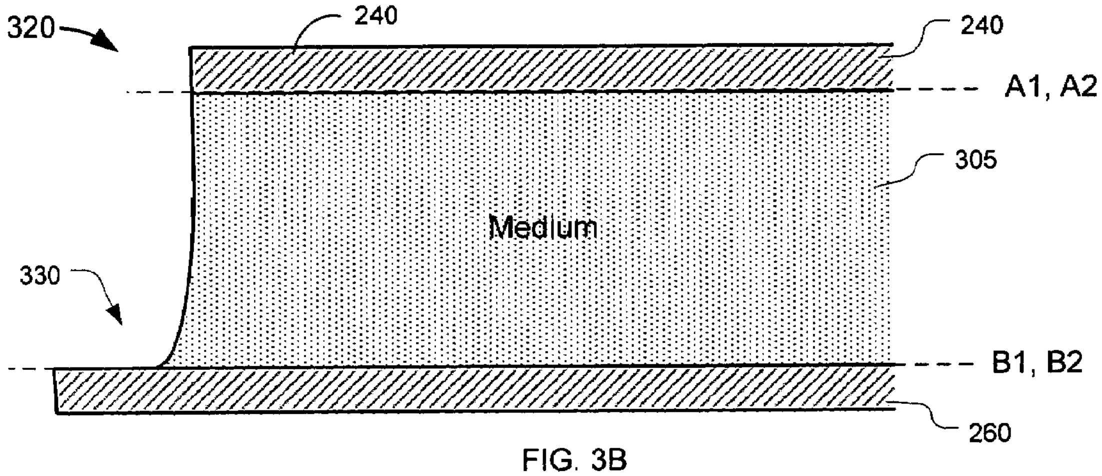
Figure 3C:
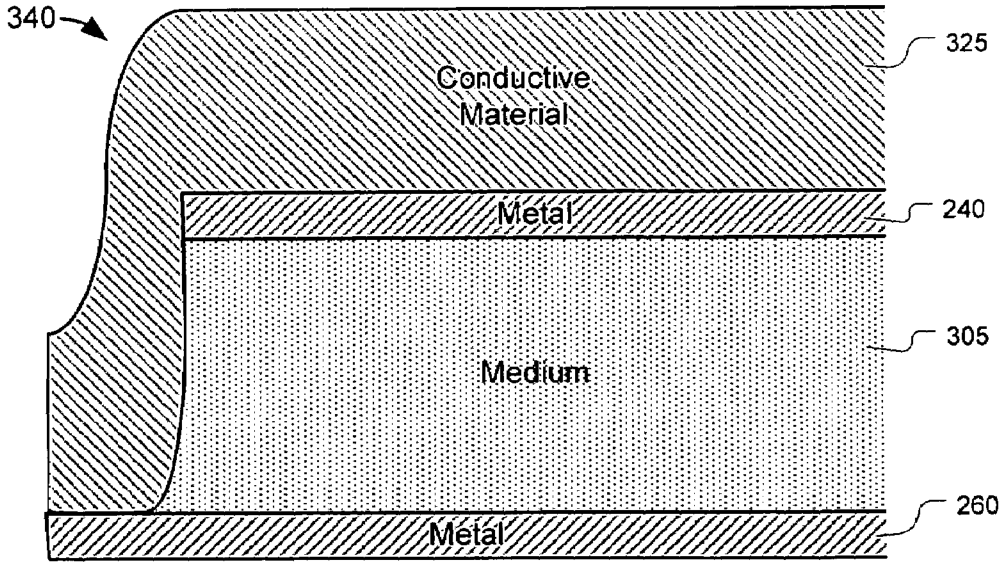

One example of a low impedance connection between the return conductor 250 on the layer 240 and the return conductor 265 on the layer 260 may be constructed according to an exemplary process sequence as illustrated in FIGS. 3A, 3B, 3C.

FIG. 3A shows a cross-sectional view of an exemplary layered structure 300 that includes a medium 305 that separates two conductive (e.g., metal) layers 240, 260.

For example, the metal layers 240, 260 may each be about 1.5–20 μm thick, and the medium 305 may be between about 7 and 250 μm thick, and particular embodiments may be between about 7 and about 20 μm thick, such as between about 7 and 13 μm, for example.

The top metal layer 240 and the bottom metal layer 260 may be composed of a substantially single metal, such as gold, copper, nickel, conductive ink, or an alloy and/or a mixture forming a conductive material, such as semiconductors or other conductive alloys.

The medium 305 may include one or more layers of materials that separate the metal layers 240, 260. For example, various dielectric materials may be present in one or more layers of the medium 305. In some embodiments, the medium 305 may include polymer, porcelain, and/or glass, for example. However, the material used may also include other materials, such as other solid dielectrics. The medium 305 may further include multiple layers of materials. For example, the medium 305 may consist of a layer of glass on top of a layer of plastic, which is on top of a layer of porcelain. In another example, the medium 305 may be a single layer of polymer and/or dielectric.

In FIG. 3B, the exemplary layered structure 300 has been partially etched to form an exemplary intermediate layered structure 320. In the exemplary structure 320, portions of the top metal layer 240 and the medium 305 have been removed from along an edge of the structure 300. The material may be removed using any suitable process or combination of processes, such as chemical etching, mechanical removal, and/or photolithography, for example. After the material has been removed down to the metal layer 260, an extended metal portion 330 near the edge of the metal layer 260 is exposed.

The example of FIG. 3B may be further understood with reference back to FIG. 2. In this embodiment, reference line A1, A2 in the cross-sectional view of FIG. 3B may correspond to a cross-section taken at reference lines A1 or A2 of the layer 240. In particular, the edge of the metal layer 240 may correspond to the reference line 225. Similarly, reference line B1, B2 in the cross-sectional view of FIG. 3B may correspond to a cross-section taken at reference lines B1 or B2 of the layer 260. In particular, the edge of the metal layer 260 may correspond to the reference line 220. Connections to the metal layers at or near these locations may support making a reliable, low impedance, low loss signal interface, such as the interface 140.

The extended metal portion 330 may be used for connecting the two metal layers 240, 325 together as illustrated in an exemplary structure 340 of FIG. 3C. The structure 340 includes conductive material 325 disposed along a side of the medium where the materials were removed from the metal layer 240 and the medium layer 305. The conductive material 325 may provide a conductive path between the two metal layers 240, 260. The widths of each connection around reference lines A1, A2 to B1, B2 may be any suitable width that may provide, for example, a reliable, low resistance, and/or a low inductance connection. In some embodiments, that connection may begin at or substantially near (c) and (−c) (see FIG. 2) and extend any suitable distance away from the signal conductor 245 in the region 205.

The conductive material 325 may be deposited in various ways to connect the metal layers 240, 260, as illustrated in the exemplary structure 340. For example, the conductive material 325 may be deposited using an electroplating, sputtering, vapor deposition, painting, soldering, and/or other metallization process or combination of processes. In some processes, additives may be provided to promote the reliability, electrical integrity (e.g., insulation), bonding, strength, conductivity, or other property of the interfaces between the conductive material being deposited and the metal layers 240, 260, the medium 305, and/or other structures. For example, the conductive material 325 may be deposited using materials or techniques that are compatible with reliably bonding and making electrical connection to a shield conductor of a coaxial connector, for example. In one embodiment, for example, the thickness of the conductive material 325 may be deposited to a thickness of between about 2 and at least 20 μm, such as about 4, 6, 8, 10, 12, 14, 16, or 18 μm, for example.

In various embodiments, the conductive structure 200 may realize the structure 340 at the edge region of the coplanar return conductor 250 and the edge region of the microstrip return conductor 265. In this example, the conductive material 325 ties the two return conductors 250 and 265 together. For example, the conductive material 325 may be deposited to connect the region 241 of the top layer 240 to the region 261 of the bottom layer 260. The conductive material 325 may also be deposited to connect the region 242 of the top layer 240 to the region 262 of the bottom layer 260. Accordingly, some embodiments may provide symmetric, low impedance connections between the metal layers 240, 260, and may further provide reduced characteristic impedance variations and reduced signal loss.

Figure 4:
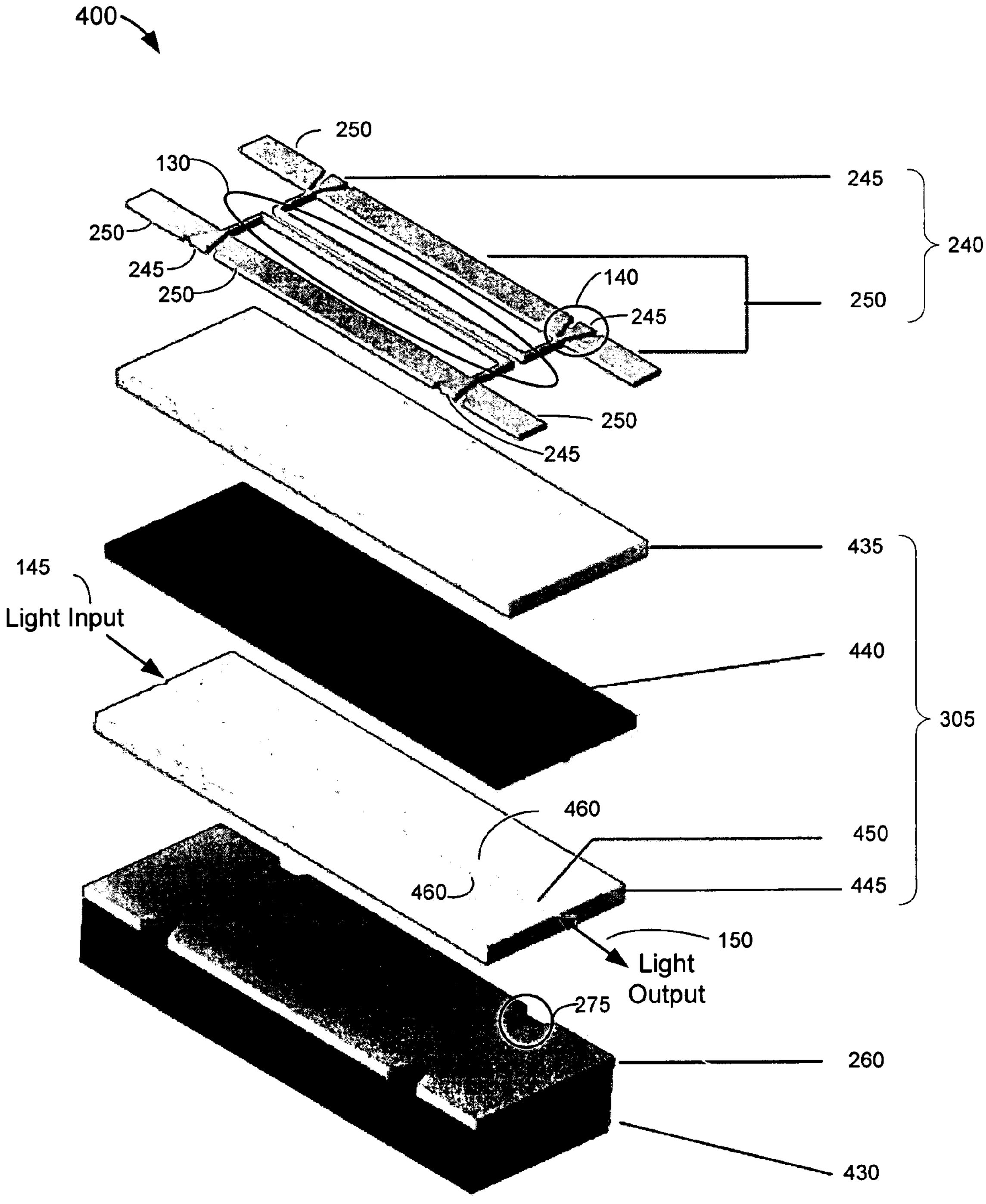
FIG. 4 is an exploded view of an exemplary electro-optical modulator that incorporates an embodiment of the layered structure of FIG. 3.

FIG. 4 shows an exploded view of an exemplary electro-optical modulator 400 that incorporates four exemplary interfaces 140 to transition between coplanar and microstrip waveguides. An example of each of the interfaces is the structure 200.

In this example, the electro-optical modulator 400 includes the top conductive layer 240, the return conductor 265, and the medium 305 between the top conductive layer 240 and the return conductor 265. The top conductive layer 240 includes four electrodes 245 and corresponding return conductors 250. In each set, each of the electrodes 245 has a transition portion 140 that connects through a microstrip portion 130 to a corresponding electrode 245.

In this example, the return conductor 265 is formed on top of a silicon substrate 430. Coplanar with the return conductor 260 are four non-conductive portions 275 that are each opposite a corresponding one of the transition portions 140.

The medium 305 includes a top clad 435, an electro-optic polymer 440, and a bottom clad 445. In the exemplary electro-optical modulator 440, the electro-optic polymer 440 fits into a trench 450 in the bottom clad 445.

In one embodiment, the top conductive layer 240 may include a conductive structure at the transition portion 140 that has the configuration illustrated and described with reference to FIG. 2, and the return conductor 260 may include a structure at the non-conductive portion 275 using the configuration illustrated and described with reference to the bottom layer 260. In one embodiment, the return conductors 250 and the return conductor 265 may connect with each other using the configuration illustrated and described with reference to the layered structure 340. For example, conductive materials, such as gold, for example, may be electro-plated or otherwise deposited around an outside edge of the medium 305 to connect the return conductors 250 to the return conductors 265.

Each of the top electrodes 245 may be coupled to an external transmission line, such as a coaxial cable, for example, to receive and/or to transmit signals. The center conductor of a coaxial cable may be bonded to the top electrode 245, and in some embodiments the center conductor may be partially flattened to facilitate bonding to the electrode 245. The coaxial shield (outer) conductor may be bonded to one or more of the return conductors, such as at least one of the return conductors 250, 260, and/or the conductive material used to connect the return conductors 250, 265 around the outside edge of the medium 305. Bonding can be thermosonic ribbon or wire bonding, and/or mated with conductive epoxies, for example.

As described with reference to FIG. 2, the electrode 245 may be in a substantially coplanar relationship with the laterally adjacent return conductors 250 through at least a portion of the transition portion 140. The E-fields associated with propagating signals may be directed substantially parallel and/or coplanar with the top conductive layer 240 between the electrode 245 and the corresponding return conductors 250 in a substantially coplanar waveguide relationship. However, the E-fields associated with a propagating signal may be directed substantially to extend through the corresponding waveguide arm 460 whereby the microstrip portion 130 operates in a substantially microstrip waveguide relationship with the return conductor 260. As previously described, the transition portion 240 may provide a smooth transition between a coplanar waveguide and a microstrip waveguide.

The exemplary electro-optical modulator 400 includes an optical waveguide in a Mach-Zehnder configuration embedded in the electro-optic polymer 440. An input 145 signal, which in this application is an optical (i.e., light) signal, may be split into two substantially equal amplitude signals that propagate along paths in waveguide arms 460, and recombine as the output signal 150. In this example, each waveguide arm 460 filled with the electro-optic polymer 440 is arranged to have a uniform distance from a corresponding one of the conductors in the microstrip portion 130. The electric fields propagating along each microstrip may pass substantially through the corresponding waveguide arms 460. The refractive index of the electro-optic polymer 440 in each of the waveguide arms 460 may be modulated in response to modulation of electromagnetic signals in the corresponding microstrip portion 130. Accordingly, the relative phase of the input (e.g., optical) signals propagating through the respective waveguide arms may be individually modulated in response to modulation of the electrical signal in the corresponding microstrip conductor. As a result of the low signal loss provided by the smooth transitions between the waveguide and microstrip waveguides, the controlling electrical signal drive requirements may be simplified, and more accurate (e.g., due to less reflected signal at the interfaces) control of the light signal modulation at high frequencies may be achieved.

In one exemplary application, the electro-optical modulator 400 may modulate a light output 150 in response to a control signal injected at one of the electrodes 245. The control signal that propagate along each microstrip portion may have a DC bias voltage and/or a modulation voltage signal. The control signals may be modulated, for example, to induce a corresponding modulation in the relative phase shift of the light passing through the corresponding waveguide arms 460. In one embodiment, modulation of the control signal in the microstrip portion 130 may induce a phase difference in the controlled output signal 150, sometimes causing destructive interference and reduced amplitude of the light output signal. In some examples, the phase difference may be any practically achievable angle up to and including substantial cancellation, such as around +/−180 degrees of phase shift, for example. Accordingly, the optical signal may be controlled to carry information encoded in analog and/or digital formats.

In some embodiments, one or both sets of electrodes 245 may be driven by independent differential voltage sources, and/or the electrodes may be driven by signals having common mode and/or differential signal components. The signals may have, for example, high and/or low frequency components, which may be a combination of binary, multilevel, triangular, sinusoidal, rectangular, square, randomly modulated, DC, or other signal patterns. The signals may be driven by a voltage or current source that may have an equivalent output impedance that may be substantially compatible with a characteristic impedance of the signal path between corresponding electrodes 245.

The electro-optical modulator 400 may be packaged for implementation in various applications, such as long and short haul telecommunications, terahertz imaging, low distortion cable TV systems, for example.

Figure 5:
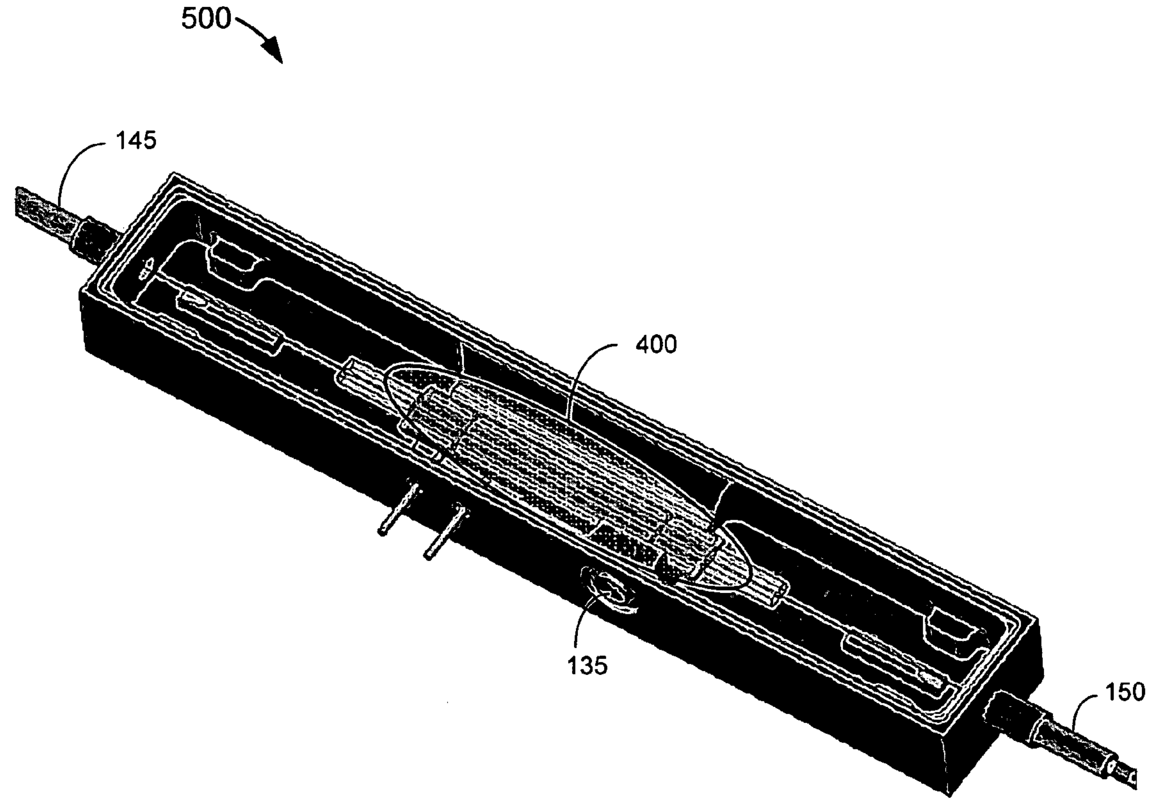
FIG. 5 is exemplary system that includes an electro-optical modulator, an example of which is shown in of FIG. 4.

FIG. 5 shows an exemplary system 500 that incorporates an electro-optical modulator. The system 500 provides a package with external connections for making connection to an electro-optical modulator such as, for example, the electro-optical modulator 400. The system 500 includes an interface 135, an optical fiber input 510, and an optical fiber output 515. In this example, two leads extending out of the side of the package next to the coax terminal represent two DC feedthroughs for DC biasing the modulator. The interface 135, which may be a wide bandwidth coaxial connection, for example, may be used to launch controlling signals onto a conductive structure 520. In one embodiment, the conductive structure may include the electro-optical modulator 400, for example. The system 500 may include an interface, such as the interface 140, to provide a transition between a coplanar waveguide and a microstrip waveguide. This interface may have a continuous characteristic impedance and may provide a smooth E-field transition with the structure similar to the exemplary structure 200.

In an exemplary application, a controller (not shown) may transmit a controlling signal through a coaxial cable to the interface 135. The control signals may be operative to modulate a light output signal received at the optical fiber input 510. After being launched onto the conductive structure 520 at the RF coax interface 135, the controlling signal may propagate along a coplanar waveguide, such as the coplanar waveguide 125. As it propagates further along the conductive structure 520, the controlling signal may transition from propagating in a coplanar mode along a coplanar waveguide to propagating in a microstrip mode along a microstrip waveguide. As described above with reference to FIG. 4, an E-field associated with the controlling signal along the microstrip waveguide may modulate an optical signal propagating between the optical fiber input 510 and the optical fiber output 515. As a result, the light output signal at the optical fiber output 515 may be controlled by the controlling signal from the controller.

The system 500 may be used in communication systems, such as the communication system 100. The communication system may incorporate one or more embodiments of the interface 140, some embodiments of which may include the layers 240, 260 connected as shown in the structure 340. Other implementations may be deployed in other signal transmission applications, such as communication, beam-steering, phased-array radars, optical routers, optical transponders, and optical satellites. Other exemplary applications may include measurement, testing, and control systems.

Some embodiments may include conductive structures that transition between coplanar and microstrip waveguides as described herein. For example, embodiments may be applied on and/or within substrates such as printed circuits, semiconductors, or polymers. Embodiments may be applied within and/or between integrated circuits (e.g., ASICs, hybrid circuits), components, connectors, transmission lines, cable assemblies, and/or adapters. For example, an embodiment may be included in an adapter for coupling a coplanar waveguide to a microstrip waveguide. In another embodiment, an embodiment may be integrated or otherwise included in a connector for removably coupling a coaxial cable to a microstrip waveguide.

Various embodiments have been described as providing conductive structures. Conductive structures may be formed from various materials using various processes. Examples of some conductive materials that may be used to form conductive structures include copper, gold, silver, and/or nickel. Examples of processes that may be used to form conductive structures include sputtering, electroplating, and laminating.

A number of embodiments of the invention have been described. Nevertheless, it will be understood that various modifications may be made without departing from the spirit and scope of the invention. For example, advantageous results may be achieved if components in the disclosed systems were combined in a different manner, or if some components were replaced or supplemented by other components and/or materials. Accordingly, other embodiments are within the scope of the following claims.

What is claimed is:

1. A signal transmission device comprising:

a medium oriented in a first plane;

a signal conduction path that is oriented in a second plane on a first planar side of the first plane, the conduction path comprising firstly, a first portion to conduct signals in a substantially coplanar waveguide mode and secondly, a second portion to conduct signals in a substantially microstrip waveguide mode;

a first ground structure in at least one portion of the second plane, the first ground structure being oriented in relation to the conduction path first portion so that signals passing through the conduction path first portion generate an electric field that is substantially coplanar with the conduction path first portion and the first ground structure; and a second ground structure in a portion of a third plane on a second planar side of the medium and opposite the first planar side, the second ground structure being oriented in relation to the conduction path second portion and the medium so that signals passing through the conduction path second portion generate an electric field oriented substantially orthogonally to the second plane and extending through the medium, wherein material deposited along an exterior edge portion of the medium forms at least one low impedance connection between the first and second ground structures.

2. The device of claim 1, wherein the signal conduction path and the first ground structure are separated by a distance that decreases monotonically from the first portion to the second portion of the conduction path.

3. The device of claim 2, wherein the distance of separation continuously decreases from the first portion to the second portion of the conduction path.

4. The device of claim 1, wherein a controlled signal passes through the medium.

5. The device of claim 4, wherein the controlled signal is controlled in response to the electric field generated by the signals passing through the conduction path second portion.

6. The device of claim 4, wherein the controlled signal comprises an optical signal.

7. The device of claim 1, wherein the medium comprises at least one thin layer having a thickness that is less than about 20 microns.

8. The device of claim 7, wherein the thin layer has a thickness that is between about 7 and about 13 microns.

9. The device of claim 1, wherein the medium comprises one or more layers having a combined thickness of less than about 250 microns.

10. The device of claim 1, wherein the at least one low impedance connection between the first and second ground structures comprises a first connection and a second connection that are located on opposite sides of the signal conduction path.

11. An electro-optic modulator device comprising:

a housing;

a medium oriented in a first plane;

a signal conduction path that is oriented in a second plane on a first planar side of the first plane, the conduction path comprising firstly, a first portion to conduct signals in a substantially coplanar waveguide mode and secondly, a second portion to conduct signals in a substantially microstrip waveguide mode;

a first ground structure in at least one portion of the second plane, the first ground structure being oriented in relation to the conduction path first portion so that signals passing through the conduction path first portion generate an electric field that is substantially coplanar with the conduction path first portion and the first ground structure; and a second ground structure in a portion of a third plane on a second planar side of the medium and opposite the first planar side, the second ground structure being oriented in relation to the conduction path second portion and the medium so that signals passing through the conduction path second portion generate an electric field oriented substantially orthogonally to the second plane and extending through the medium, wherein material deposited along an exterior edge portion of the medium forms at least one low impedance connection between the first and second ground structures.

12. The electro-optic modulator of claim 11, wherein the signal conduction path and the first planar return conductor are separated by a distance that decreases monotonically from the first portion to the second portion of the conduction path.

* * * * *